(12) United States Patent
Zhang et al.

(10) Patent No.: US 12,085,639 B2
(45) Date of Patent: Sep. 10, 2024

(54) METHOD FOR ADAPTIVELY SELECTING GROUND PENETRATING RADAR IMAGE FOR DETECTING MOISTURE DAMAGE

(71) Applicant: CHANG'AN UNIVERSITY, Xi'an (CN)

(72) Inventors: Jun Zhang, Xi'an (CN); Jun Tao, Xi'an (CN)

(73) Assignee: CHANG'AN UNIVERSITY, Xi'an (CN)

( * ) Notice: Subject to any disclaimer, the term of this patent is extended or adjusted under 35 U.S.C. 154(b) by 351 days.

(21) Appl. No.: 17/631,454

(22) PCT Filed: Oct. 13, 2020

(86) PCT No.: PCT/CN2020/120598
§ 371 (c)(1),
(2) Date: Jan. 29, 2022

(87) PCT Pub. No.: WO2021/082904
PCT Pub. Date: May 6, 2021

(65) Prior Publication Data
US 2022/0276374 A1     Sep. 1, 2022

(30) Foreign Application Priority Data

Nov. 1, 2019  (CN) .......................... 201911059296.3

(51) Int. Cl.
  *G01S 13/88*  (2006.01)
  *G01S 7/41*   (2006.01)
  *G01S 13/89*  (2006.01)

(52) U.S. Cl.
  CPC ............ *G01S 13/885* (2013.01); *G01S 7/417* (2013.01); *G01S 7/418* (2013.01); *G01S 13/89* (2013.01)

(58) Field of Classification Search
  CPC .......... G01S 7/417; G01S 7/418; G01S 13/89
  See application file for complete search history.

(56) References Cited

U.S. PATENT DOCUMENTS 10,088,586 B2 * 10/2018 McVay .................... G01V 1/30
10,234,552 B1 *  3/2019 Jazayeri ................ G01S 13/885
(Continued)

FOREIGN PATENT DOCUMENTS

CN       109212523 A     1/2019
CN       109782274 A     5/2019
(Continued)

*Primary Examiner* — Marcus E Windrich
(74) *Attorney, Agent, or Firm* — Bayramoglu Law Offices LLC

(57) ABSTRACT

A method for adaptively selecting a ground penetrating radar (GPR) image for detecting a moisture damage is provided. The method adaptively selects the GPR image according to a contrast of the GPR image. The method includes the following steps: S1, reading pre-processed GPR data; S2, adjusting a resolution of a picture; S3, inputting a data set into a recognition model; S4, outputting a moisture damage result; S5, judging whether there is a detection target or not by using an initial random image data set; and S6, generating the GPR image randomly incrementally and selecting the GPR image with a proper contrast. A proper B-scan image is found effectively, quickly and automatically by combining a recognition algorithm and a deep learning model or an image classification model to achieve an automatic recognition and detection based on the GPR image and improving a recognition precision as well.

6 Claims, 9 Drawing Sheets

(56) References Cited

U.S. PATENT DOCUMENTS

| | | | |
|---|---|---|---|
| 2007/0090989 A1* | 4/2007 | Weil | G01V 11/00 |
| | | | 250/341.1 |
| 2013/0082857 A1 | 4/2013 | Beer et al. | |
| 2016/0097879 A1* | 4/2016 | Stolarczyk | G01S 13/89 |
| | | | 342/22 |
| 2018/0011039 A1* | 1/2018 | Colosimo | G01N 33/42 |
| 2019/0154442 A1* | 5/2019 | Annovi | G01C 7/04 |
| 2020/0133298 A1* | 4/2020 | Fowler | G01S 13/86 |

FOREIGN PATENT DOCUMENTS

| | | |
|---|---|---|
| CN | 110245642 A | 9/2019 |
| CN | 111025286 A | 4/2020 |
| KR | 102030519 B1 | 10/2019 |

* cited by examiner

METHOD FOR ADAPTIVELY SELECTING GROUND PENETRATING RADAR IMAGE FOR DETECTING MOISTURE DAMAGE

CROSS REFERENCE TO THE RELATED APPLICATIONS

This application is the national stage entry of International Application No. PCT/CN2020/120598, filed on Oct. 13, 2020, which is based upon and claims priority to Chinese Patent Application No. 201911059296.3 filed on Nov. 1, 2019, the entire contents of which are incorporated herein by reference.

TECHNICAL FIELD

The present invention belongs to the field of automatic detection, relates to a ground penetrating radar image (or B-scan image), in particular to a method for adaptively selecting a ground penetrating radar image for detecting a moisture damage.

BACKGROUND

Ground penetrating radar (Ground Penetrating Radar, GPR for short) is an instrument for detecting a condition under the surface of earth and imaging by radar impulse waves, and its principle is detecting a material characteristic in a medium by emitting and receiving high frequency electromagnetic (EM) waves via an antenna. GPR uses a high frequency wireless radio wave which is usually polarized, the EM wave is emitted under the surface of the earth, and when the EM wave strikes an object buried under the surface of the earth or reaches a boundary with variable dielectric constants, a reflected wave received by the receive antenna will record a signal difference of a reflection echo. Featured with high precision, high efficiency and non-destructive in detection by ground penetrating radar, GPR is widely applied to many fields of archaeology, mineral exploration, hazardous geological survey, geotechnical engineering investigation, engineering quality detection, building structure detection and military target detection.

As GPR can be used for continuous, fast and non-destructive detection, GPR has already been applied to road traffic, for example, GPR has been widely applied to cavitation of a tunnel substrate, pavement cavitation, recognition of dowel steel or a reinforcing bar of a building or a bridge deck slab and underground pipelines. However, it is hard to explain ground penetrating radar data, explanation of the GPR image is often dependent on experience of a GPR expert. Furthermore, in an actual project, there are many pavement structures and many defect types, and depths where defects are distributed are different, for example, the defects of the asphalt pavement primarily include moisture damage, crushing and cracks centralized in an asphalt layer (the depth ranges from 0 to 22 cm). The defect of a cement pavement is primarily cavitation centralized in a semi-rigid layer (the depth is greater than 24 cm). A white and black pavement has the two defects and the depth ranging from the asphalt layer, the cement pavement, the semi-rigid layer and a roadbed are 0-1.5 m. In order to detect different defects, it is often needed to combine radar antenna in an array. Meanwhile, as a result of highway mileage, pavement inspection will generate mass data. It is hard to meet an intelligent detection demand on the pavement dependent on an artificial experience recognition method. It is an urgent need to establish a database of pavement defects and to introduce intelligent recognition methods such as deep learning to detect defects of an expressway (or other underground target bodies) intelligently.

In existing related researches, GPR images and a deep learning method are combined for automatic recognition. At present, related researches mainly focus on recognizing hyperbola targets (such as isolated target bodies, for example, a reinforcing steel bar, a crack and the like). A deep learning model is adopted to recognize and position hyperbola features of the radar image to achieve a relatively high recognition precision. A data set is constructed by optimizing GPR images with high contrast between target and ground dependent on expertise. In most cases, GPR data (A-SCAN signal, is single radar trace, or waveform) is subjected to signal post processed methods such as DC offset removal, gain processing, band-pass filtering, background removing, two-dimensional filtering, migration and deconvolution, the target body feature is highlighted from background and then the GPR image (B-SCAN, stacking of A-Scans) is intercepted to construct a proper GPR image data set. On this basis, training of a corresponding deep learning model (or an image classification model) improves the automatic recognition efficiency and precision of the GPR images, thereby providing a novel analytical method for automatic application of GPR.

However, in an existing deep learning study for recognizing the target body based on the radar images, contrasts (plot scale) of all GPR images are selected according to manual experience and are centralized in the hyperbola target with obvious features. The GPR images with suitable plot scales or contrast values can facilitate an expert or the deep model to detect the target body correctly and the images with unreasonable contrast value will gain a mistaken error. Intelligent detection application of GPR is hindered by selecting the GPR images manually.

Taking a common pavement defect as an example, the moisture damage is one of major reasons which cause early damage of the asphalt pavement. Quick detection of the moisture damage is a difficulty all the time. The Chinese patent (Method for recognizing moisture damage based on time-frequency statistic characteristic of ground penetrating radar signal, 201910100046.3) provided by the writer achieves detection and automatic analysis of the moisture damage, analyzed from the aspect of GPR data rather than spectra. GPR images is an effective method for judging the moisture damage and the bridge joint. The defect of the moisture damage is not the hyperbola feature but a more complex image feature. There are no related detection studies utilizing the images.

As a result of different moisture contents of the defects, in detection by a same set of GPR apparatus on a same path at one time, the plot scales corresponding to the proper images in different moisture damage regions are different, which hinders application of GPR in automatic detection. Therefore, it is an urgently need to provide a method for selecting the radar image with the proper contrast automatically according to the GPR data and then inputting the GPR image into the recognition model (for example the deep model) to recognize the target body (moisture damage) automatically.

SUMMARY

Aiming at deficiencies and defects in the prior art, the present invention aims to provide a method for adaptively selecting a ground penetrating radar image for detecting a moisture damage, which solves a problem of selecting the GPR image with the proper contrast value manually based on the GPR image in the prior art.

In order to solve the technical problem, the present invention adopts a technical scheme as follows:

A method for adaptively selecting a ground penetrating radar image for detecting a moisture damage, wherein the method adaptively selects a ground penetrating radar image with a proper contrast according to data of the GPR image, the method including the following steps:

S1, reading pre-processed GPR data:
generating radar images with different contrast values randomly in a set contrast data range after pre-processing GPR data, so as to construct an initial random image data set, the initial random image data set including N pictures;

S2, adjusting resolutions of the pictures:
defining the initial random image data set as an RID data set, zooming the RID data set to 224*224 and defining the zoomed data set as a RBD data set;
zooming the resolution of a moisture damage initial image data set directly to 224*224 to obtain the RBD data set;

S3, inputting the data set into a recognition model:
inputting the RBD data set obtained in the step S2 into the recognition model, and executing a step S4 after operation of the recognition model,
wherein the picture input resolution size of the recognition model is 224*224 and the picture output resolution size of the recognition model is 224*224;
the recognition model is a mixed deep learning model, the mixed deep learning model is comprised of two portions: feature extraction adopting ResNet50 and target detection adopting a YOLO V2 frame;

S4, outputting a moisture damage result:
post-processing the output result of the recognition model in the S3, post-processing including the following steps:
S41, judging the output quantity of candidate boxes BBoxes of images, executing S42 if the quantity of candidate boxes BBoxes is greater than 1, otherwise, outputting a result directly;
S42, judging whether the candidate boxes BBoxes are overlapped or not, executing S43 if the candidate boxes BBoxes are overlapped, otherwise, outputting the result directly;
S43, judging whether label names corresponding to the overlapped candidate boxes are identical or not, and if yes, the label names corresponding to the merged candidate boxes being invariable and if no, indicating that moisture damage label names and bridge joint label names are comprised simultaneously, the label names being output as bridge joint, Joint;
S44, merging the candidate boxes, taking the minimum value of intersected candidate boxes in x and y directions, taking the maximum value of w and h, and coordinates of the merged candidate boxes being [xmin, ymm, wmax, hmax];
S45, outputting the result, adjusting the output picture resolution to be equal to a picture resolution of the damage initial image data set in the output result of the recognition model, the output result being the label name with a target and an image of the candidate box BBoxes (x, y, w, h) corresponding to the target;

S5, judging whether a detection target is present or not with an initial random image data set:
S51, converting the output result BBoxes in the S4 into a matrix $A_i$ corresponding to pixel points in the picture, $A_i$ being defined as:

$$A_i[m, n] = \begin{cases} 1, & x_i \leq m \leq x_i + W_i \text{ and } y_i \leq n \leq y_i + h_i \\ 0, & \text{other} \end{cases},$$

where $1 \leq m \leq H_0$, $1 \leq n \leq W_0$ where in $H_0$ is a picture height of the image output by the recognition model and $W_0$ is a picture width of the image output by the recognition model;
summating the matrixes $A_i$ corresponding to the N pictures in the RID data set and calculating a mean value thereof to acquire a mean value matrix A, A being defined as:

$$A = \frac{1}{N}\sum_{i=1}^{N} A_i;$$

S52, setting $k_1=0.8$ and $\theta_0=0.5$, and updating the mean value matrix A according to a formula below to acquire an updated mean value matrix A, set the elements in A which are lower than the $k_1*\max(\max(A))\,\theta_0$, to 0 and up date A;

$$A(A < \max(k_1*\max(\max(A)), \theta_0)) = 0$$

wherein
$k_1$ is a target association coefficient;
$\theta_0$ is the minimum value in the matrix A if the target is comprised, and no target is present if lower than the value;
$\max(\max(A))$ is the maximum value in the mean value matrix;
S53, acquiring a judging condition T for judging whether the target is present or not according to a formula below on a basis of the updated mean value matrix A, and if T is equal to 1, indicating that a target is present and if T is equal to 0, indicating that no target is present;

$$T = \begin{cases} 1, & \text{where } \max(\max(A)) > 0 \\ 0, & \text{where } \max(\max(A)) = 0 \end{cases};$$

S6, generating the image randomly incrementally and selecting the image with a proper contrast:
when the picture contains the target, performing initial judgment;
S61, if Flag is equal to 0, indicating that the random image sample set is generated for the first time, i.e., an initial sample set stage, not entering follow-up selecting judgment, setting Flag=1, then adding 5% of N pictures additionally as a sample of the random image data set, the total number of the pictures in the sample being N=(1+5%) N, and returning to the S2;
S62, if Flag is not equal to 0, indicating a non-initial stage, setting a picture association coefficient, and selecting the picture with the maximum association coefficient of the mean value matrix A as the image with the proper contrast;
the association coefficient $R_i$ is defined as $$R_i = \frac{\sum_{m=1}^{H_0}\sum_{n=1}^{W_0}(A(m,n) - \mu_A)(A_i(m,n) - \mu_{A_i})}{\sqrt{\sum_{m=1}^{H_0}\sum_{n=1}^{W_0}(A(m,n) - \mu_A)^2 \sum_{m=1}^{H_0}\sum_{n=1}^{W_0}(A_i(m,n) - \mu_{A_i})^2}};$$

wherein $R_i$ is an association coefficient between the matrix $A_i$ corresponding to the $i^{th}$ image and the mean value matrix A; m is a coordinate value in a height direction; n is a coordinate value in a width direction; $\mu_A$ is a total mean value of the mean value matrix A; and $\mu_{A_i}$ is a total mean value of the matrix $A_i$;

a termination condition of the selection process is as following:

$$STOP = abs(F1 - F1_{pre}) < 0.01 \;\&\&\; F1 > 0.8;$$

$$F1 = 2 * \frac{Precision \cdot Recall}{Precision + Recall};$$

$$Precision = \frac{TP}{TP + FP};$$

$$Recall = \frac{TP}{TP + FN};$$

wherein F1 is an evaluation index of deep learning; $F1_{Pre}$ is an evaluation index of the previous deep learning, and is 0 initially; TP is a true target region; FP is a misrecognized true value, representing that an unrecognized true value is judged as a negative value or a background mistakenly; and FN is a misrecognized negative value, i.e., the background is taken as the target; assigning the current F1 value to a variable $F1_{pre}$ when the termination condition is not met, and then returning to the S61 to increase the sample set so as to re-select the suitable image;

outputting the image with the proper contrast by the system when the termination condition is met.

The present invention further has the following technical characteristics:

The method for acquiring GPR data includes: acquiring field data of the asphalt pavement by using the GPR system, determining a damaged region of the asphalt pavement with stripping or whitening in the field data acquisition process and acquiring GPR data corresponding to the damaged region.

During a field data acquisition process, sampling parameter requirements include that a sampling interval is smaller than 15 cm, an antenna frequency is greater than 1.6 GHz and a sampling frequency is 10-20 times of a main frequency of an antenna.

Pre-processing is a course of adopting a direct current drift connection algorithm, a ground correction algorithm, a background deduction algorithm, a band-pass filtering algorithm and performing a sliding average algorithm to perform pre-processing.

The set data range of the contrast is 0.5-1.8.

N is equal to 100.

Compared with the prior art, the present invention has the benefits that (I) Based on a concept of particle filtering, to-be-detected GPR data is read and GPR image with different contrast values are generated randomly, so that a random data set is constructed by a result. The generated images are feed into the recognition model and a threshold value is set based on a global statistic result. A proper image with suitable plot-scale value is found on this basis and consistency of the proper image found behind and after is compared as a searching and judging condition. If a stop condition is not met, a random sample image dataset size is increased continuously. The research covers image with all possible contrasts, can find the proper B-scan image quickly and effectively and solves the problem of selecting the proper radar image automatically, thereby laying a foundation for recognizing the GPR image automatically.

(II) A recognition algorithm and the deep learning model (or the image classification model) are combined to find the proper B-scan image effectively, quickly and automatically to achieve automatic recognition and detection based on the GPR spectra, and meanwhile, the recognition precision is improved.

(III) Verified by an experiment, the method and the moisture damage detection model based on YOLO are used for generating the proper GPR spectra from original GPR data and detecting the moisture damage defect automatically, thereby improving the intelligence of moisture damage detection of the asphalt pavement.

Figure 1:
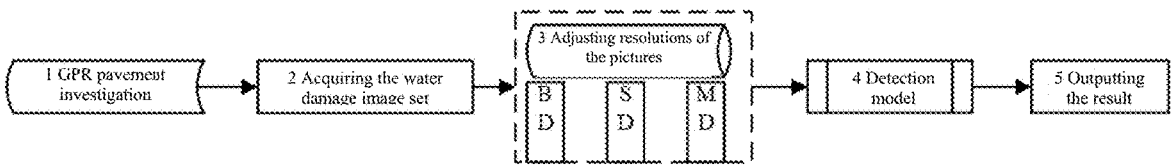
FIG. 1 is a flow diagram of a moisture damage defect detection method based on GPR.

Implications of the marks in the drawings are as follows: 1-1, GPR image corresponding to a proper contrast value, 1-2, GPR image corresponding to a too small contrast value, 1-3, GPR image corresponding to a too large contrast value and 1-4, a true moisture damage defect range in the GPR image corresponding to the proper contrast.

Further description of specific embodiments of the present invention in detail will be made below in combination with drawings.

DETAILED DESCRIPTION OF THE EMBODIMENTS

Figure 8:
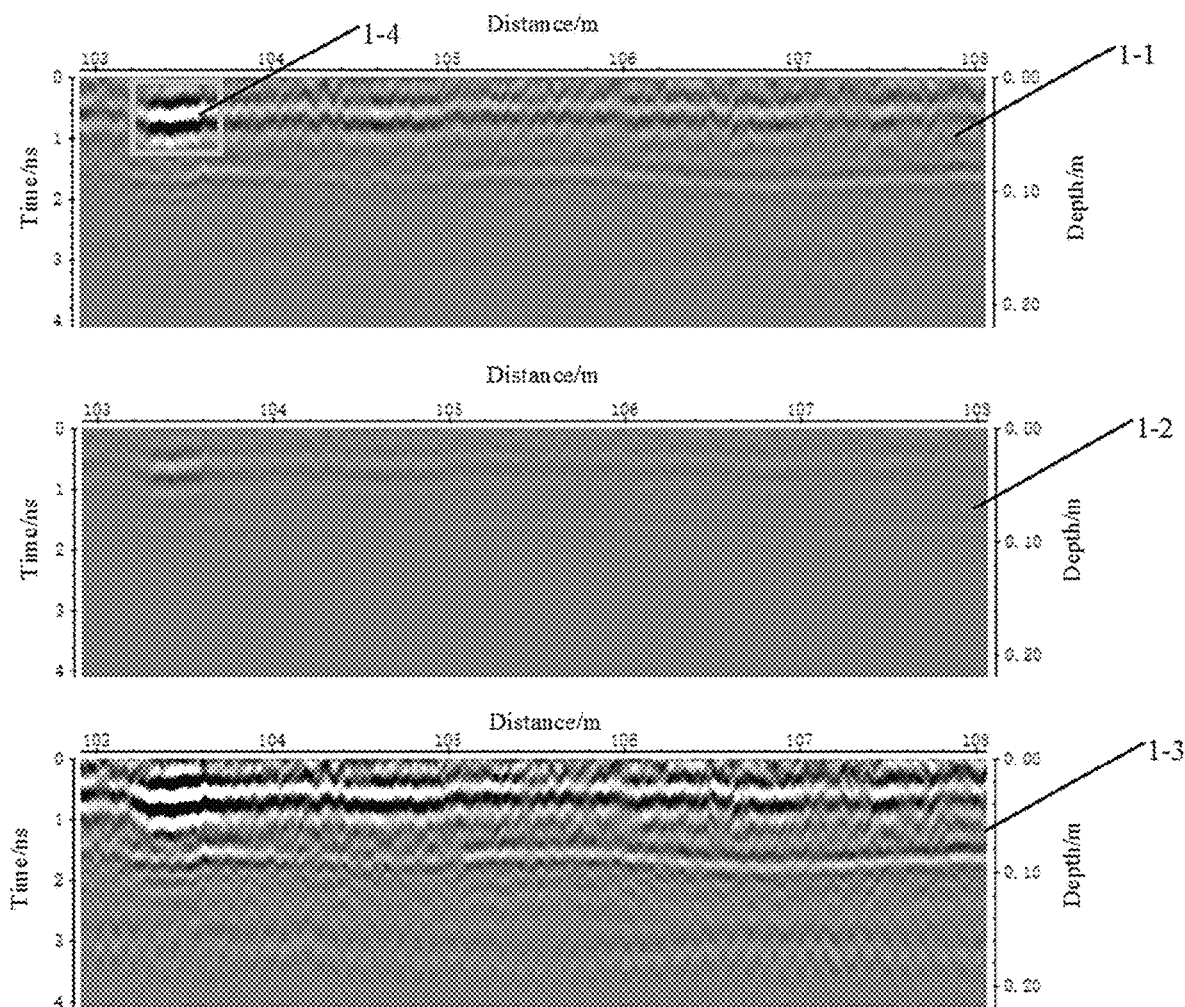
FIG. 8 is GPR image corresponding to different contrast values.

Reasons of contrasts (plot scale) on influence of GPR spectra: asphalt pavement investigation is carried out by using GPR setting to obtain radar data, the radar data is post-processed to increase difference between the target body and the background and then the processed radar data is converted into the GPR image. FIG. 8 is the GPR image corresponding to different contrasts, wherein 1-1 is a GPR image corresponding to the proper contrast, and 1-4 is the moisture damage defect range detected in the GPR data. 1-2 is a radar image corresponding to the too small contrast. But the defect feature in the region corresponding to 1-4 is not highlighted on the 1-2 image and is not easily recognized by a GPR expert or model; 1-3 is a GPR image corresponding to the too large contrast. Except the region corresponding to 1-4 is displayed as the moisture damage defect, the rest of normal pavement regions are highlighted regions which will be misjudged as the defect regions. It can be known from analysis of FIG. 8, the contrast value or plot scale value is quite important to recognize the GPR image target with the suitable contrast.

Specific embodiments of the present invention are given below. It should be noted that the present invention is not limited to the specific embodiments below and equivalent transformations made based on the technical scheme of the application shall fall within the scope of protection of the present invention.

Embodiment 1

Figure 2:
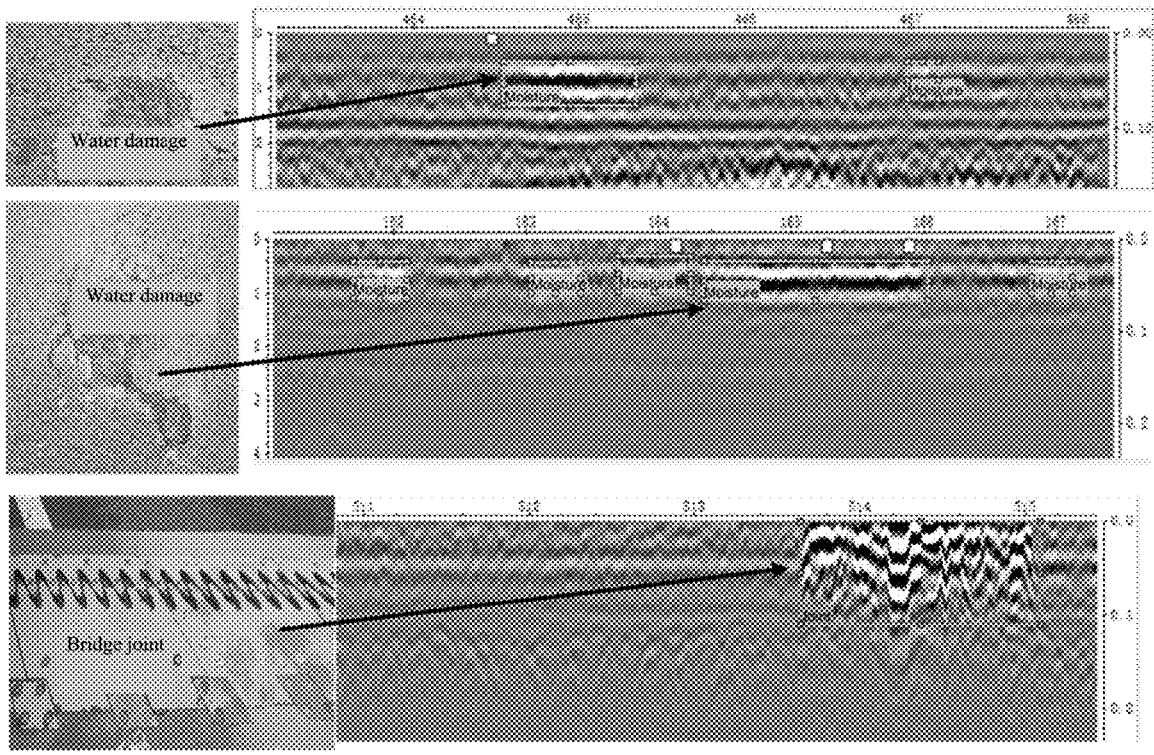
FIG. 2 is a typical image feature of the moisture damage defect data set.
Figure 3:
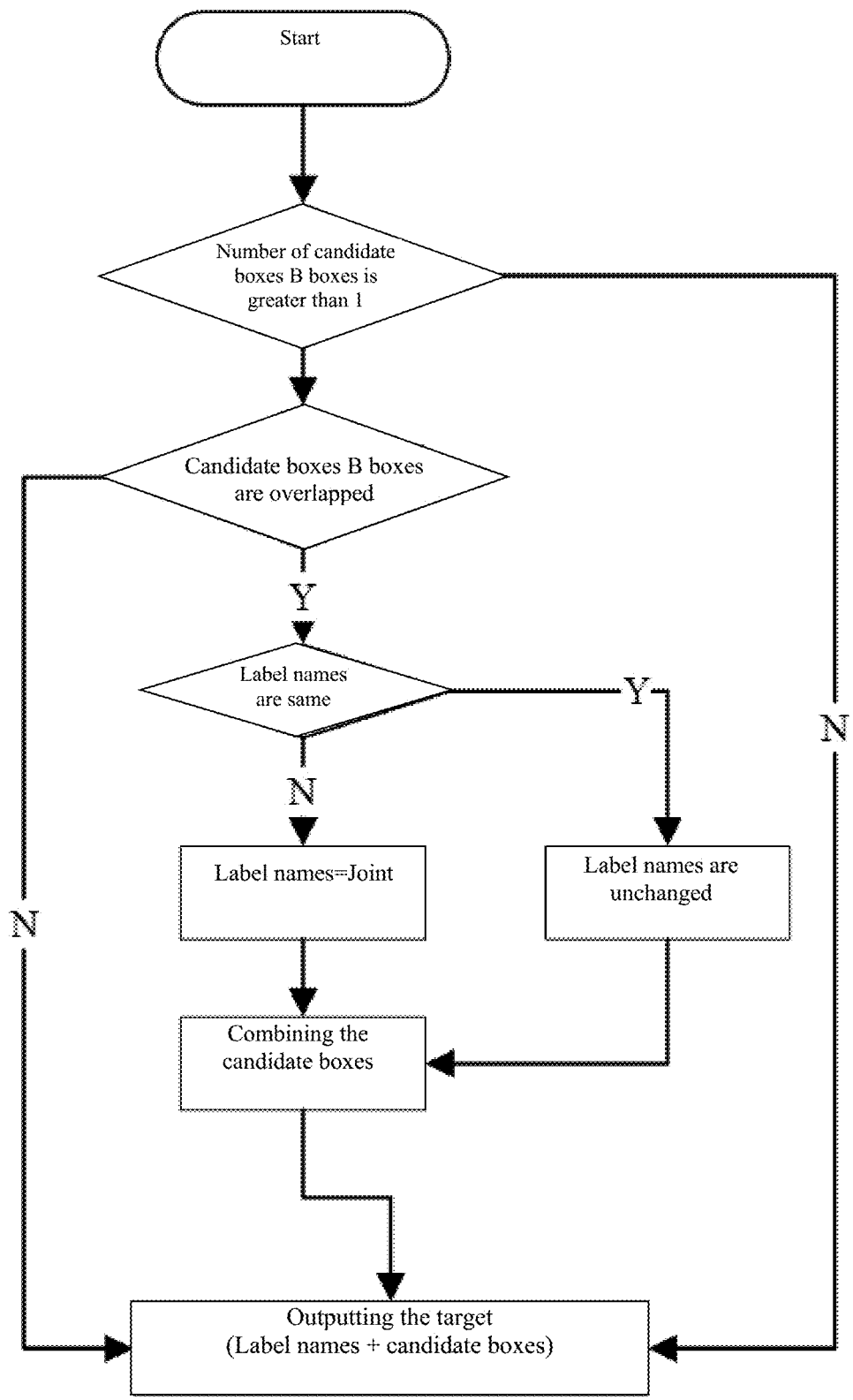
FIG. 3 is a post-processing flow diagram of a recognition model result.

The embodiment provides a method for detecting a moisture damage of an asphalt pavement as shown in the FIG. 1 to FIG. 3. The method includes the following steps:

S1, a moisture damage image data set is acquired through GPR field survey on asphalt pavements:

S11, GPR pavement investigation and data acquisition: field GPR data of the asphalt pavement acquired by using the GPR system, and a damaged region of the pavement with stripping or whitening is determined in the field data acquisition process;

In the S11, during the field data acquisition process, required by sampling parameters, a sampling interval is smaller than 15 cm, an antenna frequency is greater than 1.6 GHz and a sampling frequency is 10-20 times of a main frequency of an antenna;

these marks will emerge above the GPR image in form of small squares. In the FIG. 2, the marks of the radar spectra are "☐", and the lower sides of the marks correspond to the moisture damage defect region. The GPR images corresponding to the marks as true values of moisture damage are used for determining features of the moisture damage defect;

S12, an initial image set of the moisture damage is acquired: after pre-processing the GPR data corresponding to the damage region, the contrast of the GPR image is set and the GPR image is intercepted according to a length of 5-6 m to construct the initial image data set of the damage with the moisture damage, the bridge joint and the normal pavement, and features are marked respectively;

the image resolution of the initial image data set of the damage is 1090*300;

In the S12, pre-processing is a course of adopting a direct current (DC) drift correction algorithm (DC offset correction), a ground correction algorithm (find the ground layer), a background deduction algorithm (subtract the mean value of A-Scans), a band-pass filtering algorithm and performing a sliding average algorithm to perform pre-processing.

in the S12, the contrast of the set GPR image is 1.2-1.6, preferably 1.4 in the embodiment.

FIG. 2 is the typical image of the moisture damage defect data set, a field picture is on the left side, the corresponding GPR image is on the right side, and in a label, Moisture is the moisture damage and Joint is the bridge joint.

A process of acquiring the image data set of the moisture damage: when passing through the moisture damage region, a GPR antenna will mark in data acquisition software, and main features of the moisture damage are determined by plenty of investigation of living examples:

1) there are continuous or discontinuous highlighted regions in the asphalt layer;
2) the width/Height ratio in the image region is indefinite and is positively correlated to order of severity of the moisture damage.

The lowermost image in the FIG. 2 is the bridge joint image which is characterized in that the bridge joint presents a continuous highlighted region from the pavement downwards and the continuous highlighted region is primarily different from the highlighted region of the moisture damage:

1) The feature is highlighted from the surface of the pavement downwards and hyperbola features will emerge on two sides;
2) the highlighted region is continuous in feature and the depth from the surface to the lower side Depth is greater than or equal to 0.1 m;
3) the Width/Height ratio in the image region is smaller than 4 and the area Area is greater than 1000 pixel$^2$.

S2, resolutions of the pictures are adjusted:

It is found by researches that the images with different resolutions are different in accuracy in the recognition model and the resolutions of the pictures affect the model recognition effect directly;

the damaged initial image data set is defined as an RID data set, the ID data set is directly zoomed to 224*224 and the zoomed data set is defined as a BD data set;

the resolution of a damaged initial image data set is directly zoomed to 224*224 to obtain the BD data set;

S3, the data set is input into the recognition model:

the BD data set acquired in the S2 is input into the recognition model, and S4 is executed after operation by the recognition model;

the picture input resolution size of the recognition model is 224*224 and the picture output resolution size of the recognition model is 224*224;

the recognition model is a mixed deep learning model, the mixed deep learning model is comprised of two portions: feature extraction adopting ResNet50 and target detection adopting a YOLO V2 frame;

the ResNet50 and YOLO V2 frames are known deep learning models.

Feature extraction is comprised of four stages to achieve 16-time down sampling to convert the input 224*224 into 14*14*1024, thereby providing CNN original data to follow-up YOLO detection;

In the YOLO v2 frame, a target detection and candidate frame is provided, YOLO Class Cony is provided with grids Grid=14*14, Anchor boxes=6. Loss function set by YOLO Transform is MSE (Mean Squared Error).

The mixed deep learning model is divided into a training set and a test set by means of the images obtained in the S2, the distribution proportion being 70% and 30%. A specific model training method includes training the designed mixed deep learning model by using a TL (Transfer learning) method. Loss function of the model uses a MSE method, and the number of Anchor boxes is acquired by classifying Height/Width ratios of the moisture damage and the bridge joint of the sample set according to a K-means method.

The mixed deep learning model uses three indexes: F1, Recall and Precision to measure performance of the model.

S4, a moisture damage result is output:

A result given by the recognition model has an overlapping phenomenon, including:

1) a longer moisture damage defect will have a plurality of predicted results which are overlapped;

2) part of the bridge joints expect a plurality of results judged are misjudged as moisture damages;

therefore, FIG. 3 is the post-processing flow diagram of the GPR image with coordinate axis, specifically including:

the output result of the recognition model in the S3 is post-processed, post-processing including the steps:

S41, the quantity of candidate boxes BBoxes of GPR images in the output result is judged, S42 is executed if the quantity of candidate boxes BBoxes is greater than 1, otherwise, a result with no target is output directly;

S42, whether the candidate boxes BBoxes are overlapped or not is judged, S43 is executed if the candidate boxes BBoxes are overlapped, otherwise, the result is output directly;

S43, whether label names corresponding to the overlapped candidate boxes are judged same or not, and if yes, the label names corresponding to the merged candidate boxes being invariable and if no, moisture damage label names and bridge joint label names are comprised simultaneously are indicated, the label names being output as the bridge joints;

S44, the candidate boxes are merged, the minimum value of intersected candidate boxes in x and y directions is taken, the maximum value of w and h is taken, and coordinates of the merged candidate box being $[x_{min}, y_{min}, x_{max}, h_{max}]$;

S45, the result is output, the output picture resolution is adjusted to be equal to a picture resolution of the damage initial image data set in the output result of the recognition model, the output result being the label name with a target and an image of the candidate box BBoxes (x, y, w, h) corresponding to the target;

(A) the present invention breaks through detection focused on hyperbola feature targets in automatic detection in the existing GPR field and achieves automatic detection of moisture damage defects of the asphalt pavement with complex target body features, thereby providing a ground for precise pre-maintain the asphalt pavement and automatic positioning of the moisture damage defect.

(B) as the present invention considers influence of zooming of the resolutions of the pictures and detects the moisture damage defects automatically by using the mixed model, it is time- and labor-wasting to recognize existing moisture damage defects by means of expertise and it is affected by human factors.

(C) the training sample sets of the present invention are originated from field test data and the samples are of wide representativeness, so that the problem that a FDTD simulation software synthesized data set for existing GPR field researches is not representative in sample is solved and limitation that automatic recognition in GPR field is only focused on automatic detection of hyperbola features is broken through.

(D) as the method provided by the present invention can achieve automatic detection and accurate positioning of the moisture damage defects, the recognition model can be provided for automatic detection based on an unmanned inspection vehicle in the later period, thereby achieving periodical detection and inspection in a defect region and further achieving precise curing and intelligent pavement maintenance.

COMPARATIVE EXAMPLE 1

The comparative example provides the method for detecting the moisture damage of the asphalt pavement. Other steps of the method are same as those in the embodiment 1 and the difference is merely that the S2 is different, and the input images in the S3 are different.

S2, resolutions of the pictures are adjusted:

the damaged initial image data set is defined as an ID data set, the ID data set is cut according to a dimension of 224*224 and the cut images including the moisture damages and the bridge joints are defined as an SD data set;

the damaged initial image data set is cut according to the dimension 224*224 to obtain the SD data set.

COMPARATIVE EXAMPLE 2

The comparative example provides the method for detecting the moisture damage of the asphalt pavement. Other steps of the method are same as those in the embodiment 1 and the difference is merely that the S2 is different, and the input images in the S3 are different.

S2, resolutions of the pictures are adjusted:

the damaged initial image data set is defined as an ID data set, the ID data set is cut according to a dimension of 224*224 and the cut spectra including the moisture damages and the bridge joints are defined as an SD data set, and the spectra constructed by mixing the BD data set and the SD data set as an MD data set;

the resolution of the damaged initial image data set is adjusted to obtain the MD data set.

Figure 4:
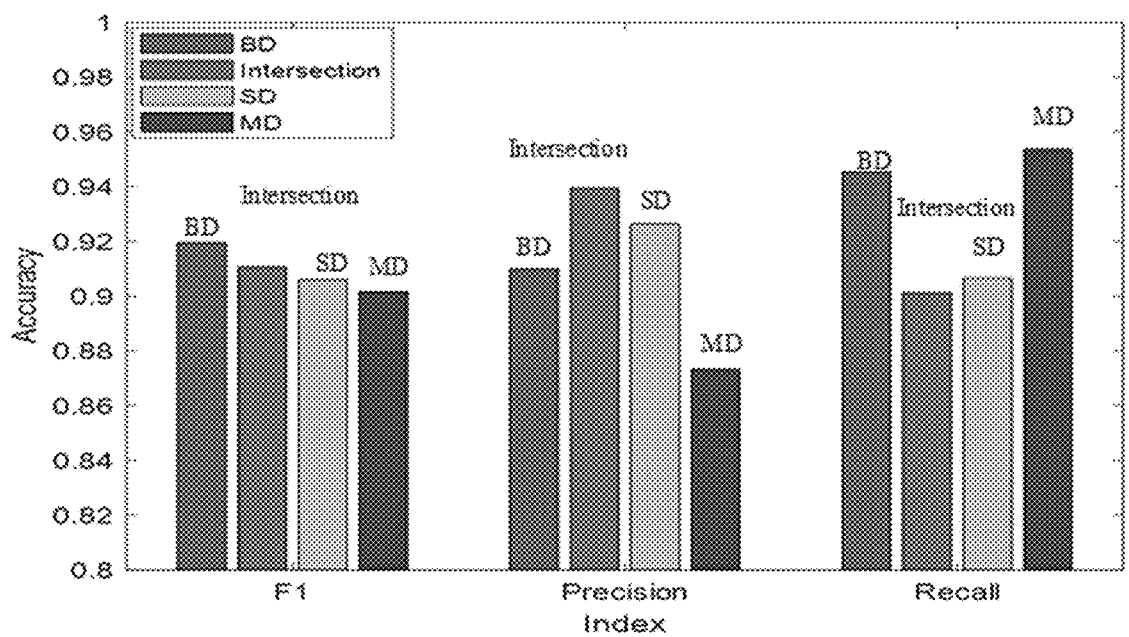
FIG. 4 is an index comparison diagram of a mixed model under different resolution data sets.

Contrastive analysis is performed on the embodiment 1, the comparative example 1 and the comparative example 2, 1431 spectra of the original image data set is constructed according to the algorithm, and the BD, SD and MD data sets are constructed according to algorithm respectively. FIG. 4 is a result of the training model. It can be known from the figure that the networks of mixed deep model trained on the data sets have better results on test set, showing that the mixed deep model is feasible. The model trained on the BD data set is optimum, the recognition precision of the model is F1=91.97%, Recall=94.53% and Precision=91.00%. Thus, the training model is selected as the BD model, and preferably, a resolution zooming method zooms the original spectra directly in an equal proportion.

COMPARATIVE EXAMPLE 3

The comparative example provides a method for detecting the moisture damage of the asphalt pavement. The method detects the moisture damage of the asphalt pavement by using an ACF (Aggregate Channel Features) algorithm.

COMPARATIVE EXAMPLE 4

The comparative example provides a method for detecting the moisture damage of the asphalt pavement. The method detects the moisture damage of the asphalt pavement by using a Cifar10 model.

Figure 5:
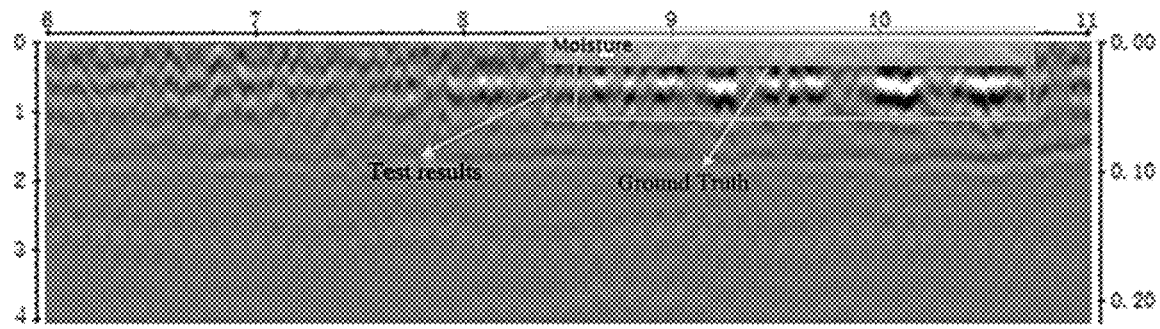
FIG. 5 is a moisture damage detection result diagram under the mixed model.
Figure 6:
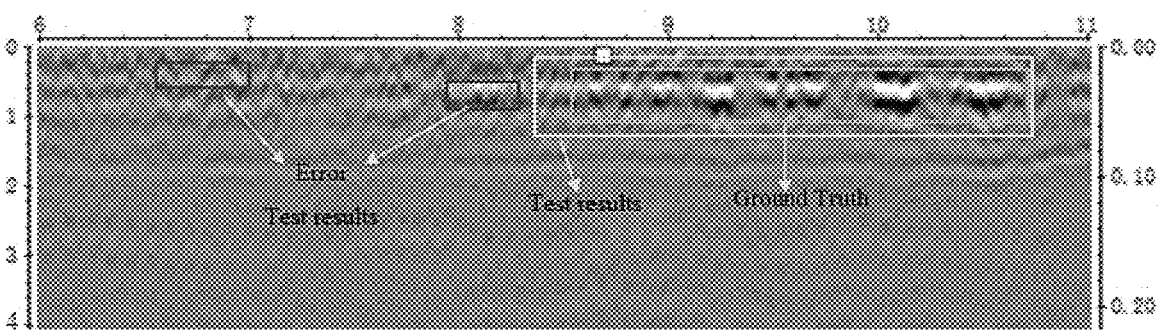
FIG. 6 is a detection result diagram of an ACF algorithm.
Figure 7:
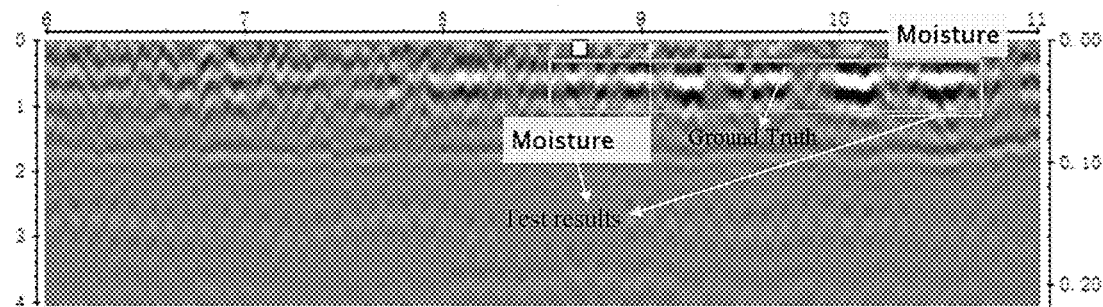
FIG. 7 is a detection result diagram by using a Cifar 10 model.

Contrastive analysis is performed on the embodiment 1, the comparative example 3 and the comparative example 4. FIG. 5 to FIG. 7 are comparative results between the deep model and ACF (Aggregate Channel Features) and Cifar10 and Ground Truth is a true value of the moisture damage. It is found by comparison that the two comparative methods have redundant detection regions or a lot of leak detection regions, and the comparative results further verify the accuracy of the method.

Embodiment 2

The embodiment provides a method for adaptively selecting a ground penetrating radar image for detecting a moisture damage. As shown in the FIG. 9, the method adaptively selects the GPR image according to a contrast of the GPR image, the method including the following steps:

S1, pre-processed GPR data is read:

GPR images with different contrasts are generated randomly in a set contrast data range after pre-processing GPR data to construct an initial random image data set, the initial random image data set including N pictures;

The method for acquiring the GPR data includes: acquiring field data of the asphalt pavement by using the GPR system, determining a damaged region of the pavement with stripping or whitening in the field data acquisition process and acquiring the GPR data corresponding to the damaged region.

In a field data acquisition process, required by sampling parameters, a sampling interval is smaller than 15 cm, an antenna frequency is greater than 1.6 GHz and a sampling frequency is 10-20 times of a main frequency of an antenna.

Pre-processing is performed in a pre-processing course by adopting a direct current drift correction algorithm, a ground correction algorithm, a background deduction algorithm, a band-pass filtering algorithm and a moving average algorithm.

The set contrast value range is 0.5-1.8.

N is equal to 100.

S2, resolutions of the pictures are adjusted:

It is found by researches that the images with different resolutions are different in accuracy in the recognition model and the resolutions of the pictures affect the model recognition effect directly;

the initial random image data set is defined as an RID data set, the RID data set is zoomed to 224*224 and the data set is defined as a RBD data set;

the resolution of the moisture damage initial image data set is zoomed directly to 224*224 to obtain the RBD data set;

S3, the data set is input into a recognition model:

the RBD data set acquired in the S2 is input into the recognition model, and S4 is executed after operation by the recognition model;

the picture input resolution size of the recognition model is 224*224 and the picture output resolution size of the recognition model is 224*224;

the recognition model is a mixed deep learning model, the mixed deep learning model is comprised of two portions, feature extraction adopts ResNet50 and target detection adopts a YOLO V2 frame;

the ResNet50 and YOLO V2 frames are known deep learning models.

Feature extraction is comprised of four stages to achieve 16-time down sampling to convert the input 224*224 into 14*14*1024, thereby providing CNN original data to follow-up YOLO detection;

In the YOLO v2 frame, a target detection and candidate frame are provided, YOLO Class Conv is provided with grids Grid=14*14, Anchor boxes=6.Loss function set by YOLO Transform is MSE.

The mixed deep learning model is divided into a training set and a test set by means of the images obtained in the S2, the distribution proportion being 70% and 30%. A specific model training method includes training the designed mixed deep learning model by using a TL method. Loss function of the model uses a MSE method, and the number of Anchor boxes is acquired by classifying Height/Width ratios of the moisture damage and the bridge joint of the sample set according to a K-means method.

The mixed deep learning model uses three indexes: F1, Recall and Precision to measure performance of the model.

S4, a moisture damage result is output:

the output result of the recognition model in the S3 is post-processed, post-processing including the steps:

S41, the quantity of candidate boxes BBoxes of images in the output result is judged, S42 is executed if the quantity of candidate boxes BBoxes is greater than 1, otherwise, the result directly is output;

S42, whether the candidate boxes BBoxes are overlapped or not are judged, S43 is executed if the candidate boxes BBoxes are overlapped, otherwise, the result directly is output;

S43, whether label names corresponding to the overlapped candidate boxes are identical or not are judged, and if yes, the label names corresponding to the merged candidate boxes being invariable and if no, indicating that moisture damage label names and bridge joint label names are comprised simultaneously, the label names being output as bridge joint, Joint;

S44, the candidate boxes are merged, the minimum value of intersected candidate boxes in x and y directions is taken, the maximum value of w and h is taken, and coordinates of the merged candidate boxes being $[x_{min}, y_{min}, w_{max}, h_{max}]$;

S45, the result is output, the output picture resolution is adjusted to be equal to a picture resolution of the damage initial image data set in the output result of the recognition model, the output result being the label name with a target and an image of the candidate box BBoxes (x, y, w, h) corresponding to the target;

S5, whether a detection target is present or not is judged with an initial random image data set:

S51, the output result in the S4 is converted into a matrix $A_i$ corresponding to pixel points in the picture, $A_i$ being defined as:

$$A_i[m, n] = \begin{cases} 1, & x_i \leq m \leq x_i + W_i \text{ and } y_i \leq n \leq y_i + h_i \\ 0, & \text{other} \end{cases},$$

where $1 \leq m \leq H_0$, $1 \leq n \leq W_0$ wherein $H_0$ is a picture height of the image output by the recognition model and $W_0$ is a picture width of the image output by the recognition model;

the matrixes $A_i$ corresponding to the N pictures in the RID data set are summated and a mean value thereof is solved to acquire a mean value matrix A, A being defined as $$A = \frac{1}{N} \sum_{i=1}^{N} A_i;$$

S52, as the range of the contrast is optimized, the target is greatly different from the background. If the tested GPR data contains the target, output results of most GPR images shall include the target region, and a mean value matrix A is large in value in the region. If the tested GPR data is free of the target, fewer image corresponding to improper contrasts have targets, and the mean value matrix A is small in value in the region.

$k_1=0.8$ and $\theta_0=0.5$ are set, and the mean value matrix A is updated according to a formula below to acquire an updated mean value matrix A, $$A(A<\max(k^* \max(\max(A)),\theta_0))=0$$

wherein $k_1$ is a target correlation coefficient for adjusting the maximum value of the mean value so as to judge different targets;

$\theta_0$ is the minimum value in the matrix A if the target is comprised, and if it is lower than the value, there is no target;

max(max(A)) is the maximum value in the mean value matrix A;

S53, a judging condition T for judging whether the target is present or not is acquired according to a formula below on a basis of the updated mean value matrix A, if T is equal to 1, indicating that a target is present and if T is equal to 0, indicating that no target is present;

$$T = \begin{cases} 1, & \text{where } \max(\max(A)) > 0 \\ 0, & \text{where } \max(\max(A)) = 0 \end{cases};$$

S6, generating the GPR image randomly with increment method and selecting the image with a proper contrast:

when the picture contains the target, performing initial judgment;

S61, if Flag is equal to 0, indicating that the random image sample set is generated for the first time, i.e., an initial sample set stage, not entering follow-up selecting judgment, setting Flag=1, then adding 5% of N pictures additionally as a sample of the random image data set, the total number of the pictures in the sample being N=(1+5%) N, and returning to the S2;

S62, if Flag is not equal to 0, indicating a non-initial stage, setting a picture association coefficient, and selecting the picture with the maximum association coefficient of the mean value matrix A as the image with the proper contrast;

the association coefficient $R_i$ is defined as $$R_i = \frac{\sum_{m=1}^{H_0}\sum_{n=1}^{W_0}(A(m,n)-\mu_A)(A_i(m,n)-\mu_{A_i})}{\sqrt{\sum_{m=1}^{H_0}\sum_{n=1}^{W_0}(A(m,n)-\mu_A)^2 \sum_{m=1}^{H_0}\sum_{n=1}^{W_0}(A_i(m,n)-\mu_{A_i})^2}};$$

wherein $R_i$ is an association coefficient between the matrix $A_i$ corresponding to the $i^{th}$ image and the mean value matrix A; m is a coordinate value in a height direction; n is a coordinate value in a width direction; $\mu_A$ is a total mean value of the mean value matrix A; and $\mu_{A_i}$ is a total mean value of the matrix $A_i$;

a termination condition of the selection process is as follows:

$$\text{STOP} = \text{abs}(F1 - F1_{pre}) < 0.01 \,\&\&\, F1 > 0.8;$$

$$F1 = 2*\frac{\text{Precision} \cdot \text{Recall}}{\text{Precision} + \text{Recall}};$$

$$\text{Precision} = \frac{TP}{TP+FP};$$

$$\text{Recall} = \frac{TP}{TP+FN};$$

wherein F1 is an evaluation index of deep learning; $F1_{Pre}$ is an evaluation index of the previous deep learning, and is 0 initially; TP is a true target region; FP is a misrecognized true value, representing that a unrecognized true value is judged as a negative value or a background mistakenly; and FN is a misrecognized negative value, i.e., the background is taken as the target; an index F1 calculated this time is assigned to a variable $F1_{Pre}$ when the termination condition is not met, and then returning to the S61 to increase the sample set so as to re-select;

the image with the proper contrast is output by the system when the termination condition is met.

Figure 9:
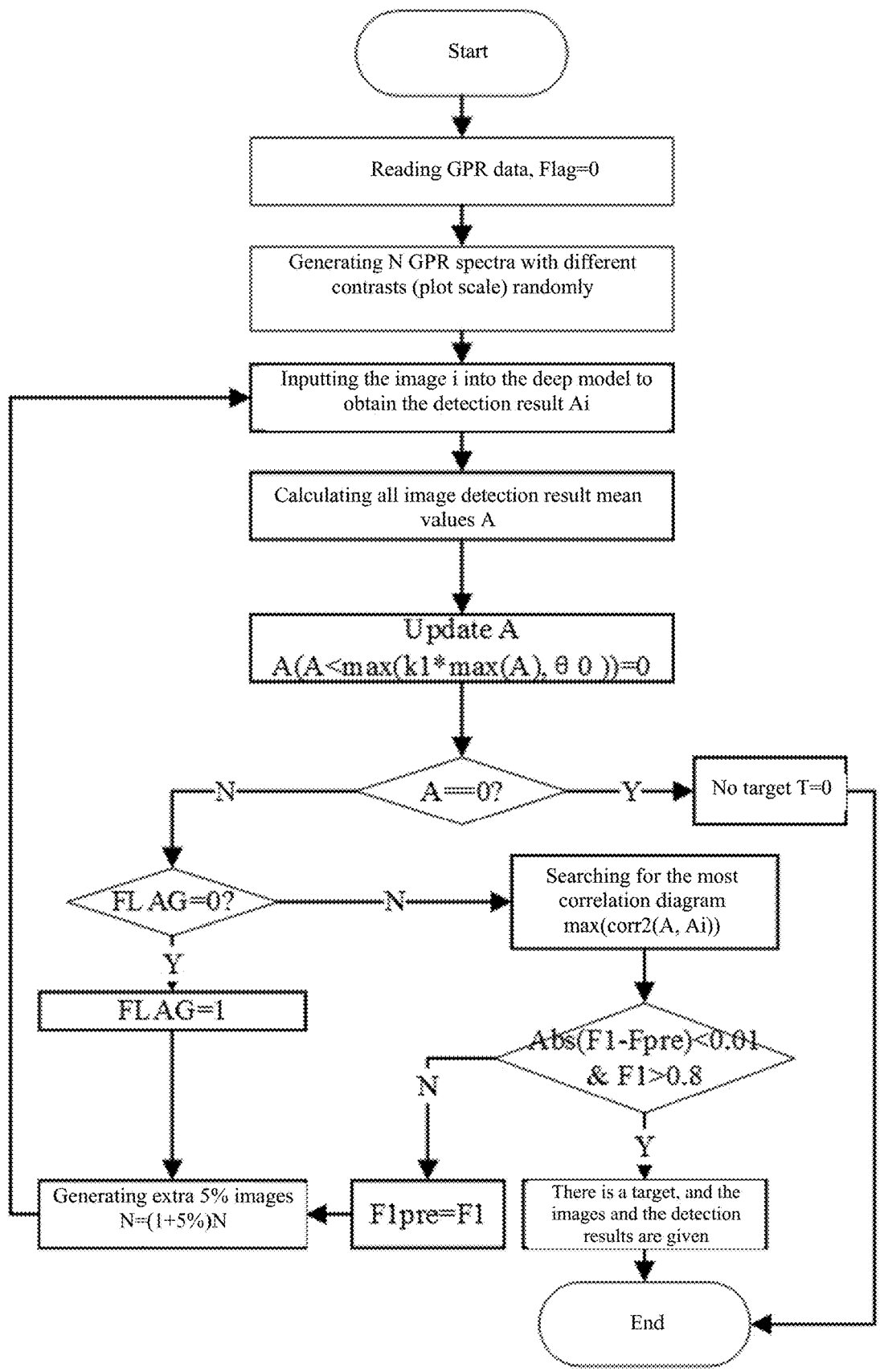
FIG. 9 is a GPR image recognition algorithm with the proper contrast.

Effect Test Comparison:

By adopting the moisture damage image data set constructed manually, the deep learning model is trained by using the YOLO detection frame and the transfer learning and is recognized in combination with the algorithm in the FIG. 9. GPR data is consistent with data in the FIG. 8. In order to observe the change rule of indexes dependent on random sample number of the method, the initial sample set in the FIG. 9 is N=20, the value of the contrast is 0.6-1.8, the parameter $k_1=0.8$, $\theta_0=0.5$ in the matrix A is updated, and N is equal to 100 in actual application.

Figure 10:
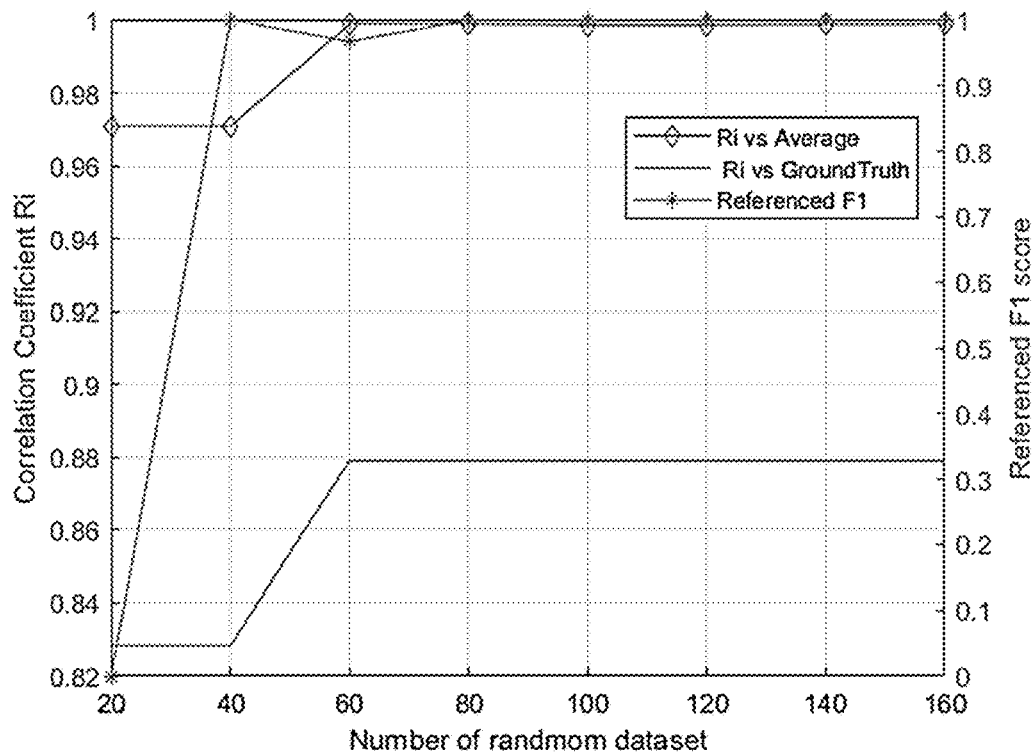
FIG. 10 is a change rule of related coefficients dependent on number of sampled samples.

FIG. 10 is a change rule of the correlation coefficient dependent on the sampled sample number, wherein Referenced F1 is a F1 index, and the other two curves are correlation coefficients between the preferred image and the mean value A and the true value (Ground Truth). It can be known from the figure that with increase of the sample number, the correlation coefficients R are increased and is stabilized at a fixed value and are not increased along with increase of the sample number, showing that the algorithm has found the preferred GPR image.

Figure 11:
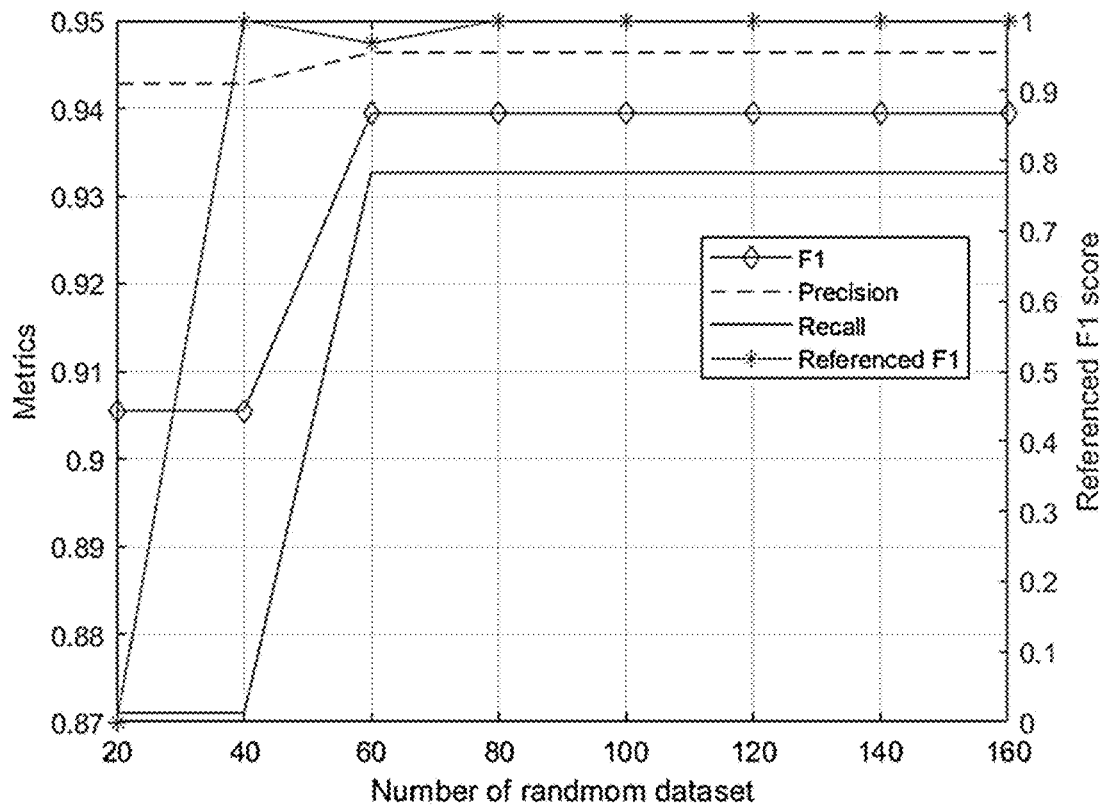
FIG. 11 is a change rule of related indexes of the deep model dependent on number of sampled samples.

FIG. 11 is a change rule of the deep model related index dependent on the sampled sample number, F1, Precision and Recall are evaluation indexes of the deep model. Similarly, after the preferred result is found, the indexes are stable, showing that a proper image is found.

Figure 12:
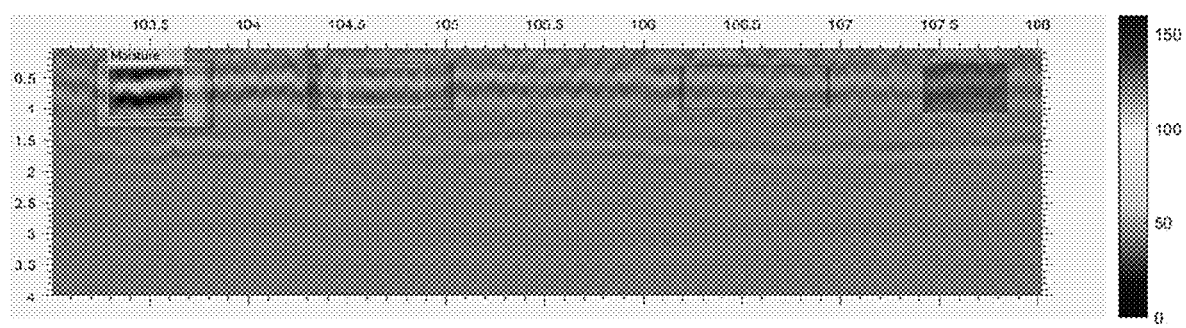
FIG. 12 is a heatmap result for overall detection of a random data set overlapping on an optimum image.

FIG. 12 is a heatmap for overall detection of the random data set with 160 random sample sets overlapped on the preferred image. It can be known that in the region corresponding to 103.5 m, 160 pictures have moisture damages (target) results at the position and are consistent with the true value (1-4 in the FIG. 8) region. The three indexes are greater than 0.93, showing that the preferred image is very close to the true value and the correctness of the algorithm is verified.

Figure 13:
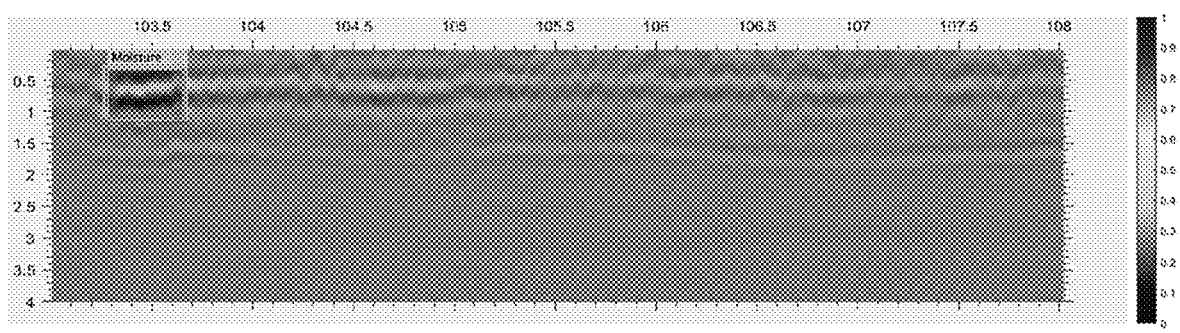
FIG. 13 is a heatmap result of mean value of matrix A overlapping on an optimum result

FIG. 13 is a heatmap of the mean value A overlapped on the preferred result (i.e., all detection results in the random image data set are accumulated and the size of the accumulated results is reflected by color). As the mean value A takes out all the results below maximum value*0.8 in the matrix A in the updating process and the results are average values. It can be known by comparing the detection result with the Ground Truth that the goodness of fit is very high, and the correctness of the algorithm is further verified.

Figure 14:
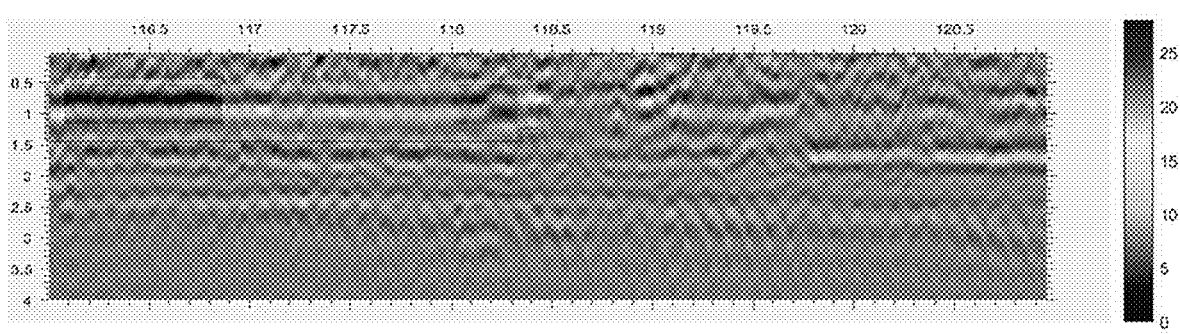
FIG. 14 is a heatmap result for overall detection of the normal pavement and the random data set.

FIG. 14 is a heatmap of overall detection of the normal pavement on the random data set. As the size of the initialized sample number is 100 and the maximum value in the figure is only 28 (the mean value is 0.28 after calculation) and is smaller than a threshold value of $\theta_0=0.5$). The test data is classified into the normal pavement, which is consistent with actual condition.

Figure 15:
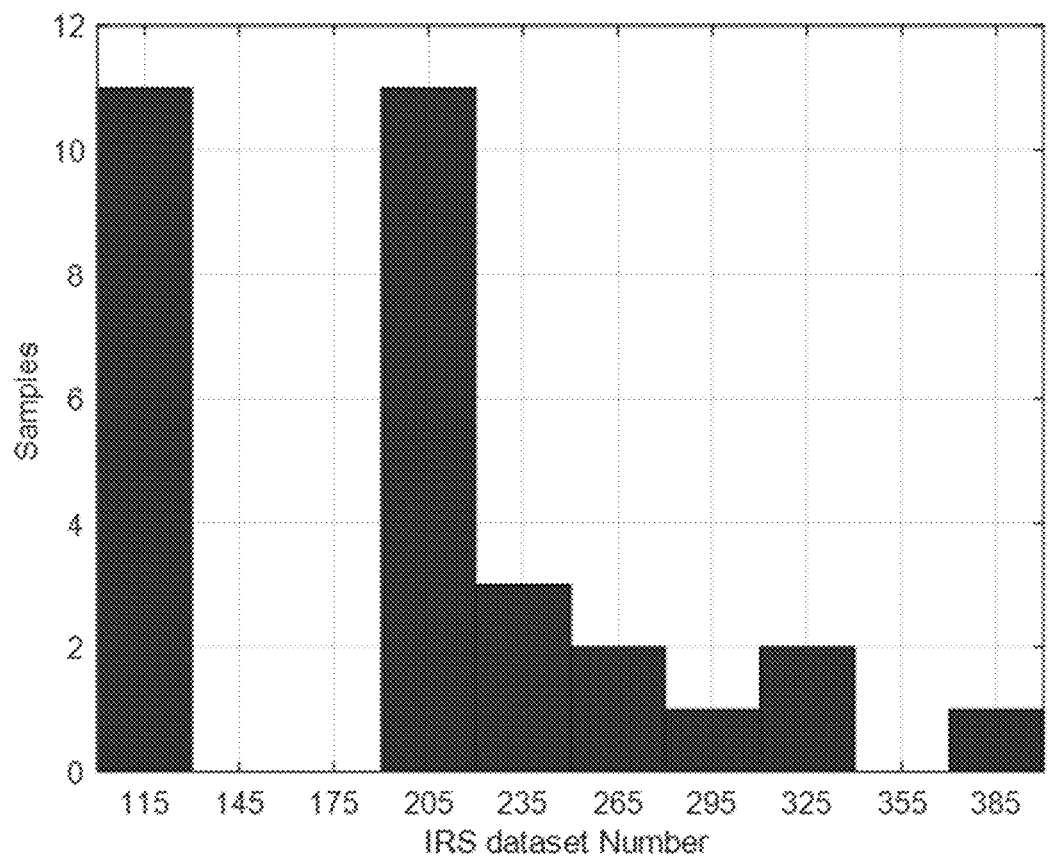
FIG. 15 is a distribution rule of the number of random samples of a test data set.

FIG. 15 is a distribution rule of the random sample number of the test data set. 31 samples (11 normal pavements and 20 moisture damage samples) are tested by the algorithm, showing that the algorithm classifies the 11 normal pavements effectively, wherein the number of used samples is 100; the random samples needed by the moisture damage region is mainly focused between 200 and 300. As 95% of GPR data for pavement investigation are normal pavements, the algorithm can save the calculating cost effectively.

Figure 16:
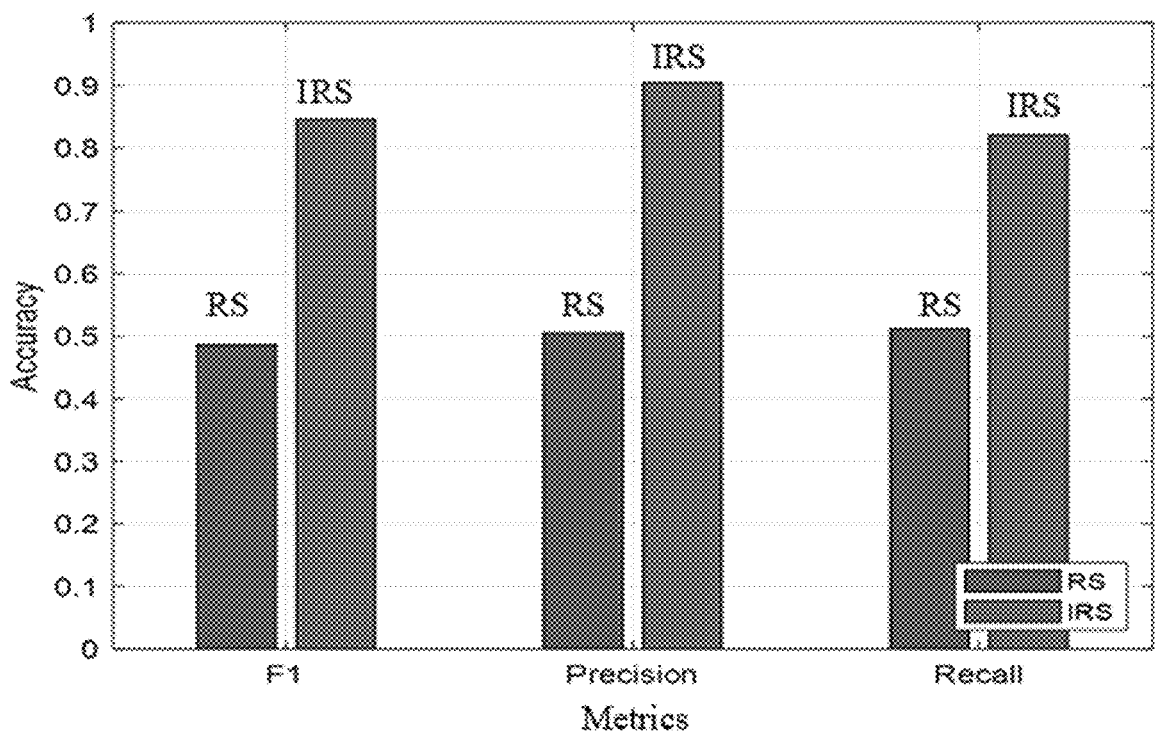
FIG. 16 is a comparison result of the algorithm (IRS) and the random sample (RS) in a moisture damage test set.
Figure 17:
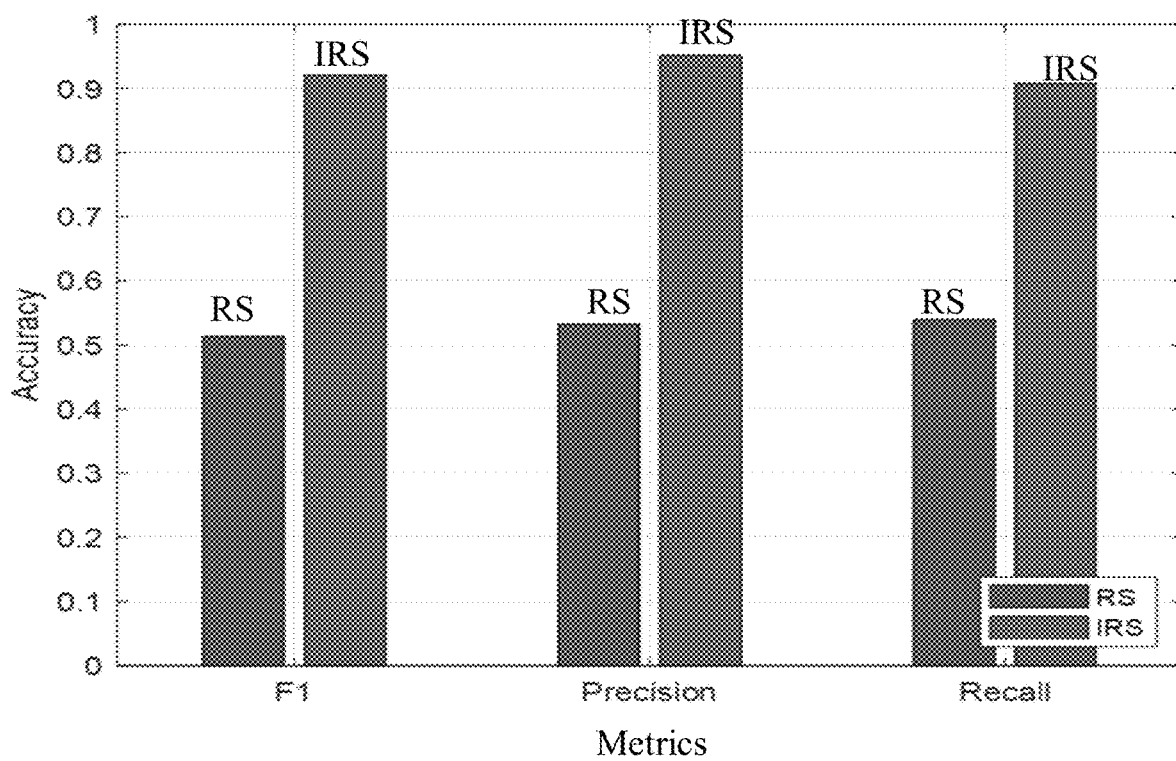
FIG. 17 is a comparison result of the algorithm (IRS) and the random sample (RS) with the normal pavement increasingly.

In order to further describe the effectiveness of the method (an incremental sampling method, marked as IRS) and compare the result of random selection method (RS), the FIG. 16 is a comparison result for data sets (20) with moisture damages and FIG. 17 increases 11 normal pavement results. It can be known form the result that the IRS method can recognize the defects effectively and is higher in precision.

It is shown by the experiment that the incremental sampling method and the deep model are combined in use, such that the radar spectra with proper contrasts can be selected from the GPR original data effectively, thereby providing an effective method for automatic application of GPR.

Although the method verifies recognition of the moisture damage defects, the method is not limited to the case. Recognition of the targets in other radar spectra by the method shall fall within the scope of protection of the present invention.

Embodiment 3

The embodiment provides a method for detecting the moisture damage of the asphalt pavement based on adaptive selection of gray levels of images. As shown in the FIG. 1 to FIG. 17, the method is substantially as same as the method for detecting the moisture damage of the asphalt pavement of the embodiment 1. The difference is merely replacing setting the contrast of the GPR image and intercepting the GPR image at a length of 5-6 m with selecting the GPR image with a proper contrast and intercepting the GPR image at a length of 5-6 m in the S12.

The selection method for the GPR image with the proper contrast is the adaptive selection method for the GPR image;

the adaptive selection method for the ground penetrating image is as same as the method for detecting the moisture damage of the asphalt pavement in the embodiment 2.

The recognition models in the embodiment 1 and the embodiment 2 are same, and the post-processing steps in the embodiment 1 and the embodiment 2 are same.

The method of the embodiment can optimize the image for each GPR data and input the optimized image to the deep model to obtain the detection result. The method solves the problem of image optimization and image recognition of the moisture damage, thereby truly achieving automatic and intelligent work on moisture damage defect detection.

What is claimed is:

1. A method for automatically detecting moisture damage defects by adaptively selecting a Ground Penetrating Radar (GPR) image for detecting a moisture damage, wherein the method adaptively selects the GPR image with a proper contrast according to data of the GPR image, comprising the following steps:

S1, reading pre-processed GPR data:
generating GPR images with different contrasts randomly in a set contrast data range after pre-processing GPR data to construct an initial random image data set, wherein the initial random image data set comprising N pictures;
S2, adjusting resolutions of the N pictures:
defining the initial random image data set as an RID data set, zooming the RID data set to 224*224 to obtain a zoomed data set and defining the zoomed data set as an RBD data set;
zooming a resolution of a moisture damage initial image data set directly to 224*224 to obtain the RBD data set;
S3, inputting the RBD data set into a recognition model:
inputting the RBD data set obtained in the step S2 into the recognition model, and executing a step S4 after an operation of the recognition model, wherein a picture input resolution size of the recognition model is 224*224 and a picture output resolution size of the recognition model is 224*224;
the recognition model is a mixed deep learning model, wherein the mixed deep learning model is comprised of two portions: a feature extraction adopting ResNet50 and a target detection adopting a YOLO V2 frame;
S4, outputting a moisture damage result:
post-processing an output result of the recognition model in the S3, wherein the post-processing comprising the following steps:
S41, judging a quantity of candidate boxes BBoxes of a spectra in the output result, executing S42 when the quantity of candidate boxes BBoxes is greater than 1, otherwise, outputting a result directly;
S42, judging whether the candidate boxes BBoxes are overlapped or not, executing S43 when the candidate boxes BBoxes are overlapped, otherwise, outputting the result directly;
S43, judging whether label names corresponding to overlapped candidate boxes are identical or not, wherein when label names corresponding to the overlapped candidate boxes are identical, the label names corresponding to merged candidate boxes are invariable and when label names corresponding to the overlapped candidate boxes are not identical, indicating that moisture damage label names and bridge joint label names are comprised simultaneously, the label names are output as bridge joint, Joint;
S44, merging the candidate boxes BBoxes, taking a minimum value of intersected candidate boxes in x and y directions, taking a maximum value of w and h, wherein coordinates of a merged candidate box are $[x_{min}, Y_{min}, W_{max}, h_{max}]$;
S45, outputting the result, adjusting an output picture resolution to be equal to a picture resolution of the moisture damage initial image data set in the output result of the recognition model, wherein the output resul is a label name with a target and an image of the candidate box BBoxes (x, y, w, h) corresponding to the target;
S5, judging whether a detection target is present or not with the initial random image data set:
S51, converting the output result in the S4 into a matrix $A_i$ corresponding to pixel points in a picture, wherein $A_i$ is defined as:

$$A_i[m, n] = \begin{cases} 1, & x_i \leq m \leq x_i + W_i \text{ and } y_i \leq n \leq y_i + h_i \\ 0, & \text{other} \end{cases},$$

where $1 \leq m \leq H_0$, $1 \leq n \leq W_0$;
- wherein $H_0$ is a picture height of an image output by the recognition model and $W_0$ is a picture width of the image output by the recognition model;
- summating the matrixes $A_i$ corresponding to the N pictures in the RID data set and calculating a mean value of the matrixes $A_i$ to acquire a mean value matrix A, wherein A is defined as:

$$A = \frac{1}{N}\sum_{i=1}^{N} A_i;$$

S52, setting $k_1=0.8$ and $\theta_0=0.5$, and updating the mean value matrix A according to a formula below to acquire an updated mean value matrix A;

$$A(A < \max(k_1 * \max(\max(A)), \theta_0)) = 0;$$

wherein
- $k_1$ is a target association coefficient;
- $\theta_0$ is a minimum value in the matrix A when the target is comprised, and no target is present when the mean value is lower than the minimum value;
- $\max(\max(A))$ is a maximum value in the mean value matrix A;
- S53, acquiring a judging condition T for judging whether the target is present or not according to a formula below on a basis of the updated mean value matrix A, and when the judging condition T is equal to 1, indicating that the target is present and when the judging condition T is equal to 0, indicating that no target is present;

$$T = \begin{cases} 1, & \text{where } \max(\max(A)) > 0 \\ 0, & \text{where } \max(\max(A)) = 0 \end{cases};$$

and
S6, generating the GPR image randomly incrementally and selecting the GPR image with the proper contrast:
when the picture contains the target, performing an initial judgment;
S61, when Flag is equal to 0, indicating that a random image sample set is generated for a first time, in an initial sample set stage, not entering a follow-up selecting judgment, setting Flag=1, then adding 5% of the N pictures additionally as a sample of the initial random image data set, a total number of the N pictures in the sample is N=(1+5%) N, and returning to the S2;
S62, when the Flag is not equal to 0, indicating a non-initial stage, setting a picture association coefficient, and selecting the picture with a maximum association coefficient of the mean value matrix A as the GPR image with the proper contrast;
the picture association coefficient $R_i$ is defined as:

$$R_i = \frac{\sum_{m=1}^{H_0}\sum_{n=1}^{W_0}(A(m,n)-\mu_A)(A_i(m,n)-\mu_{A_i})}{\sqrt{\sum_{m=1}^{H_0}\sum_{n=1}^{W_0}(A(m,n)-\mu_A)^2 \sum_{m=1}^{H_0}\sum_{n=1}^{W_0}(A_i(m,n)-\mu_{A_i})^2}};$$

wherein $R_i$ is the picture association coefficient between the matrix $A_i$ corresponding to an $i^{th}$ image and the mean value matrix A;

m is a coordinate value in a height direction;

n is a coordinate value in a width direction;

$\mu_A$ is a total mean value of the mean value matrix A; and $\mu_{A_i}$ is a total mean value of the matrix $A_i$;

a termination condition of a selection process is as follows:

$$STOP = abs(F1 - F1_{pre}) < 0.01 \,\&\&\, F1 > 0.8;$$

$$F1 = 2 * \frac{\text{Precision} \cdot \text{Recall}}{\text{Precision} + \text{Recall}};$$

$$\text{Precision} = \frac{TP}{TP+FP};$$

$$\text{Recall} = \frac{TP}{TP+FN};$$

wherein F1 is an evaluation index of a deep learning; $F1_{pre}$ is an evaluation index of a previous deep learning, and is 0 initially; TP is a true target region; FP is a misrecognized true value, representing that an unrecognized true value is judged as a negative value or a background mistakenly; and FN is a misrecognized negative value, wherein the background is taken as the target;

assigning the evaluation index F1 calculated to a variable $F1_{pre}$ when the termination condition is not met, and then returning to the step S61 to increase the random image sample set to re-select;

outputting the GPR image with the proper contrast by a GPR system when the termination condition is met;

S7, detecting moisture damage defects automatically based on results of the steps S1-S6.

2. The method according to claim 1, wherein acquiring the GPR data comprises: acquiring field data of an asphalt pavement by using the GPR system, determining a damaged region of the asphalt pavement with pumping or whitening in a field data acquisition process and acquiring the GPR data corresponding to the damaged region.

3. The method according to claim 1, wherein during a field data acquisition process, sampling parameter requirements comprise a sampling interval smaller than 15 cm, an antenna frequency greater than 1.6 GHz and a sampling frequency 10-20 times of a main frequency of an antenna.

4. The method according to claim 1, wherein pre-processing is a course of adopting a direct current drift connection algorithm, a ground correction algorithm, a background deduction algorithm, a band-pass filtering algorithm and performing a sliding average algorithm to perform the pre-processing.

5. The method according to claim 1, wherein the set contrast data range is 0.5-1.8.

6. The method according to claim 1, wherein N is equal to 100.

\* \* \* \* \*